United States Patent

[11] 3,628,622

| [72] | Inventor | Heinrich Kiwitz<br>239 Eversbuschstrasse, 8 Munich-Allach, Germany |
|---|---|---|
| [21] | Appl. No. | 837,584 |
| [22] | Filed | June 30, 1969 |
| [45] | Patented | Dec. 21, 1971 |
| [73] | Assignee | Maschinenfabrik Augsburg-Nurnberg Aktiengesellschaft<br>Munich 50, Germany |

[54] ENGINE HOOD FOR A TRUCK
8 Claims, 5 Drawing Figs.

[52] U.S. Cl. ........................................... 180/69 C
[51] Int. Cl. ............................................ B62d 25/10
[50] Field of Search .............................. 180/69, 54, 89; 296/76

[56] References Cited
UNITED STATES PATENTS

| 2,151,229 | 3/1939 | Piroumoff et al. | 180/69 X |
| 2,606,625 | 8/1952 | Paton | 180/69 C |
| 2,612,233 | 9/1952 | Newell | 180/69 C |
| 3,338,326 | 8/1967 | Hafer et al. | 180/69 C |

FOREIGN PATENTS

| 870,251 | 6/1961 | Great Britain | 180/69 C |

*Primary Examiner*—Benjamin Hersh
*Assistant Examiner*—Milton L. Smith
*Attorneys*—Francis D. Stephens and Hugo Huettig, Jr.

ABSTRACT: The engine hood and front fenders are formed in a single piece which is hinged to the cab beneath the windshield. The bottom of the hood is elastically engaged with the front end of the cab frame.

INVENTOR
Heinrich Kiwitz

INVENTOR
Heinrich Kiwitz

INVENTOR
Heinrich Kiwitz

INVENTOR
Heinrich Kiwitz

ENGINE HOOD FOR A TRUCK

This invention relates to a vehicle body for a truck which includes the driver's cab, the engine hood and the front fenders and in which the engine hood and fenders are formed in a single piece and hinged to the cab below the windshield in such a way that the hood and fenders can be swung upwardly. Such driver's cab bodies are used in order to permit good access to the engine by swinging the unit composed of the engine hood and fenders upwardly and out of the way. The mounting of such a structure on the vehicle frame forms among other things the difficulty that the driver's cab is an element that is fixed with regard to rotation or twisting and has to be mounted on a soft structural part, such as the vehicle frame, with regard to displacement or twisting. Heretofore, attempts to mount the cab rigidly on the framework and where the engine hood was movably engaged with the cab and also supported on the framework were impractical because relative movements between the individual attachment points on the cab were subject to considerable wear and tear, especially when the truck was driven on a rough terrain or bad roads, as, for example, on a construction site. Even the use of limited elastic bearing surfaces were not able to produce sufficient improvements.

The object of this invention is to avoid the aforesaid difficulties and to produce a body in which the hood and fenders are moved as a unit so that excellent accessibility to the engine is obtained as well as avoiding unnecessary wear and tear in operation over a rough terrain.

In general, this object is obtained by supporting the engine hood and front fender unit exclusively on the cab and using an intermediate absorption or damping element.

The hood and cab combination is mounted on the vehicle framework only by way of the cab frame members so that the individual attachment points can be placed very close together. The relative movements of the vehicle frame and above all the distortion stresses around the longitudinal axis of the frame have only very little effect on the points lying adjacent and between those points in the longitudinal direction of the vehicle. This invention therefore has the greatest advantage in that, when the vehicle frame is strongly distorted in driving the truck in rough open territory, the attachment points for the cab are subject to very little stress. Because the engine hood and front fender unit are exclusively mounted on the cab, the frame of the cab can be shortened and thus be made of heavier material while keeping the same weight so that this has a further improvement of overall stability.

The engine hood-front fender unit is mounted on the cab in such a way that two longitudinal frame members of the cab extend forwardly beyond its front wall and have free ends to which are joined bulletlike absorption or damping elements which are used as the bracing members for the engine hood and front fender unit. Because of its simplicity, this arrangement is especially favorable. A further feature of this invention is in that the longitudinal frame members of the cab, which when seen from the driver's cab, end before the center of gravity of the engine hood-front fender unit. This positioning of the damping or absorption elements or members produces a very good sidewise guidance and form for the closed engine hood and front fender unit and, moreover, any vibrations occurring on the hood are absorbed and not transferred to the cab and vice versa. A further feature of the invention is that the absorption or damping elements are held either hydraulically or mechanically under tension and thus prevent any undesirable flipping up of the engine hood and front fender unit which could occur due to strong vibrations when driving over a rough terrain.

In a further feature of the invention, reinforcing metal sheets are arranged inside the hood adjacent each sidewall, each sheet extending essentially vertically and in the longitudinal direction of the hood, and which are fastened at the rearward end to the hood abutment member. The vertical arrangement of the two reinforcing sheets longitudinally of the hood corresponds to the direction of the main tensions and stresses which, in turn, corresponds to the position of the hinges and abutments for the engine hood and front fender unit and thus provides the greatest reinforcement while keeping the use of materials to a minimum. Also, the shape and manner of attaching the reinforcing metal sheets is strengthened. Accordingly, each reinforcing metal sheet has a trapezium shape and with its upper triangular portion and the sidewall of the engine hood together with the part of the front fender extended inside the hood and a rearward triangular terminating sheet forms a tetrahedron. This closed tetrahedron cell reinforces the engine hood and front fender unit together with the terminating sheet and the other structural members which are already present for forming the cell and gives the maximum rigidity with a minimum use a material. The lowest and approximately rectangular portion of the reinforcing metal sheet at the same time is used as the inner wall for the front fender and protects the engine space from the wheel box.

Another feature of this invention is that the tetrahedron cell is used as an air passageway to supply air to the driver's cab by means of slots through the sidewall of the hood and a hole in the terminal end sheet.

The means by which the objects of this invention are obtained are described more fully with reference to the accompanying drawings in which.

Figure 1:
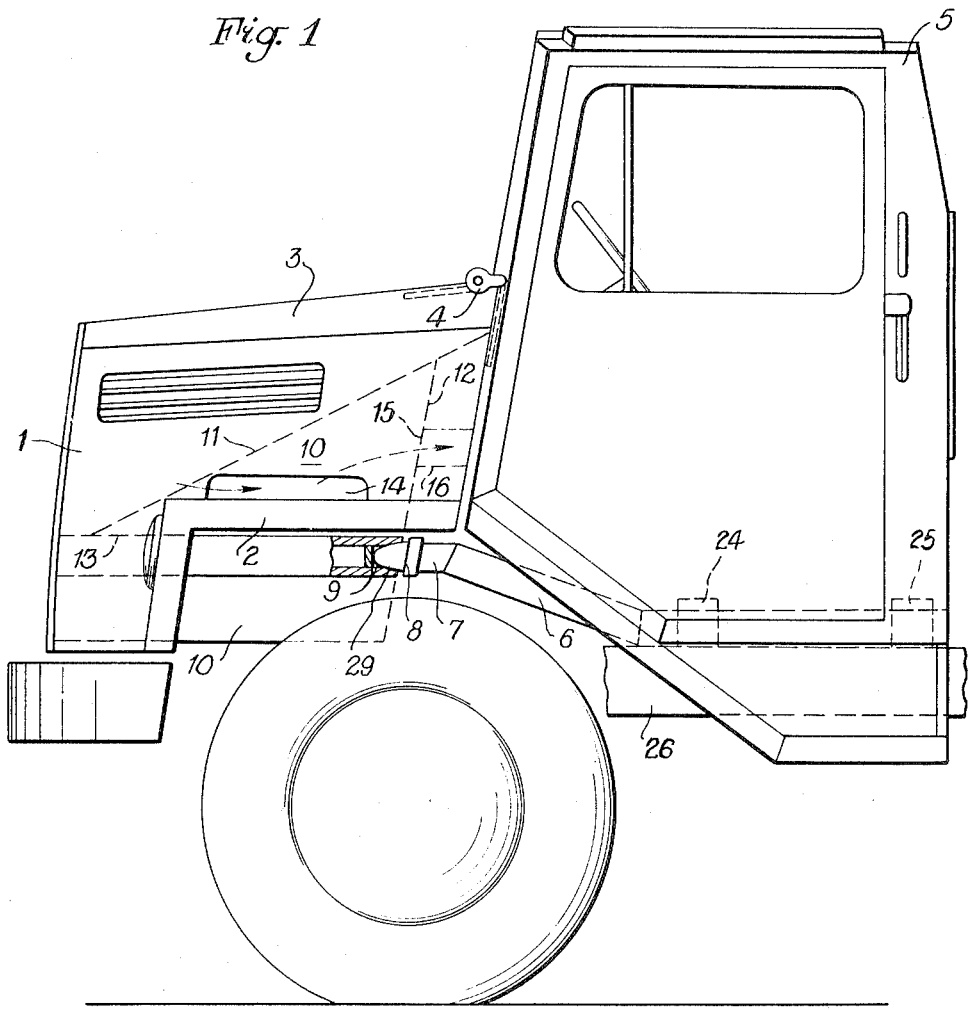
FIG. 1 is a side elevational view of the cab, engine hood and fenders, partly in section.
Figure 2:
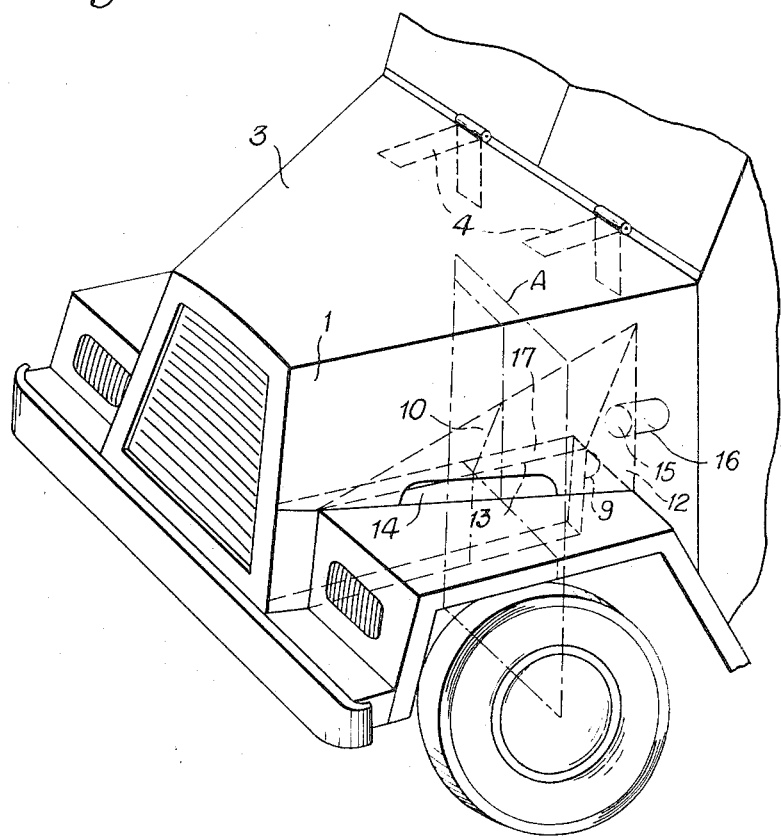
FIG. 2 is a perspective view of FIG. 1.
Figure 3:
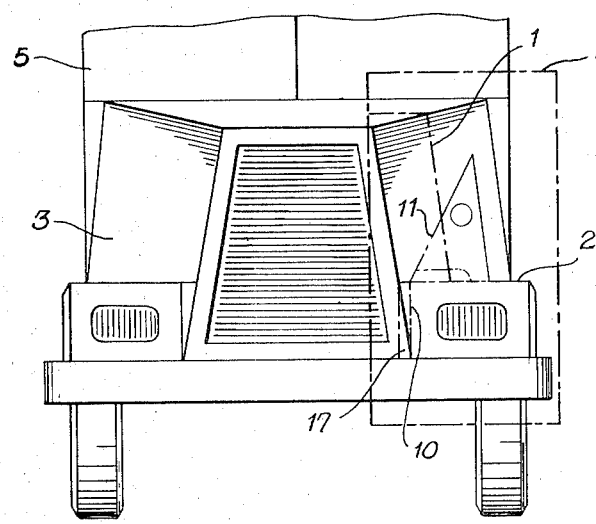
FIG. 3 is a front elevational view of the cab taken on the plane A, FIG. 2, and shown laid in the same plane as the drawing sheet, and where all lines of the engine hood-front fender unit lying in said plane A being shown as dash-dot lines.
Figure 4:
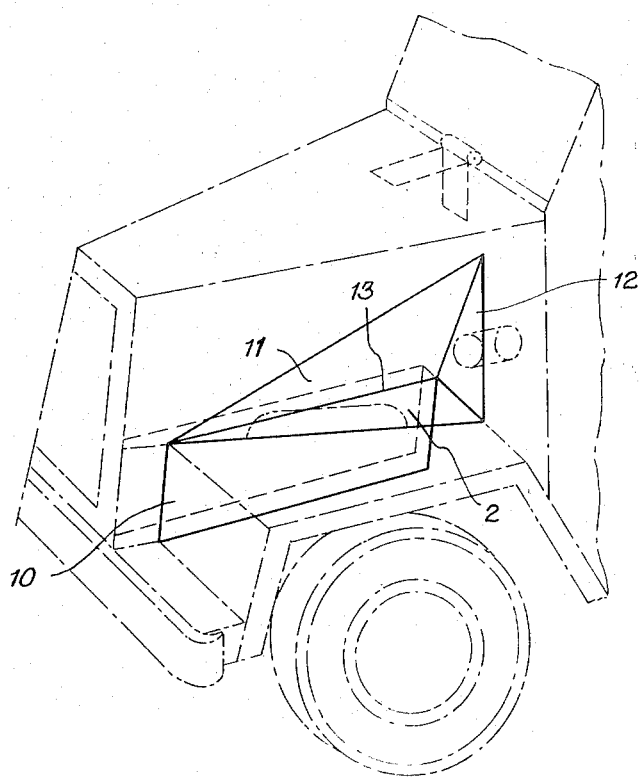
FIG. 4 is a partial view of the cab position as shown as in FIG. 2 with only the closed tetrahedron cell and the trapezium shaped metal sheet being shown in unbroken lines.
Figure 5:
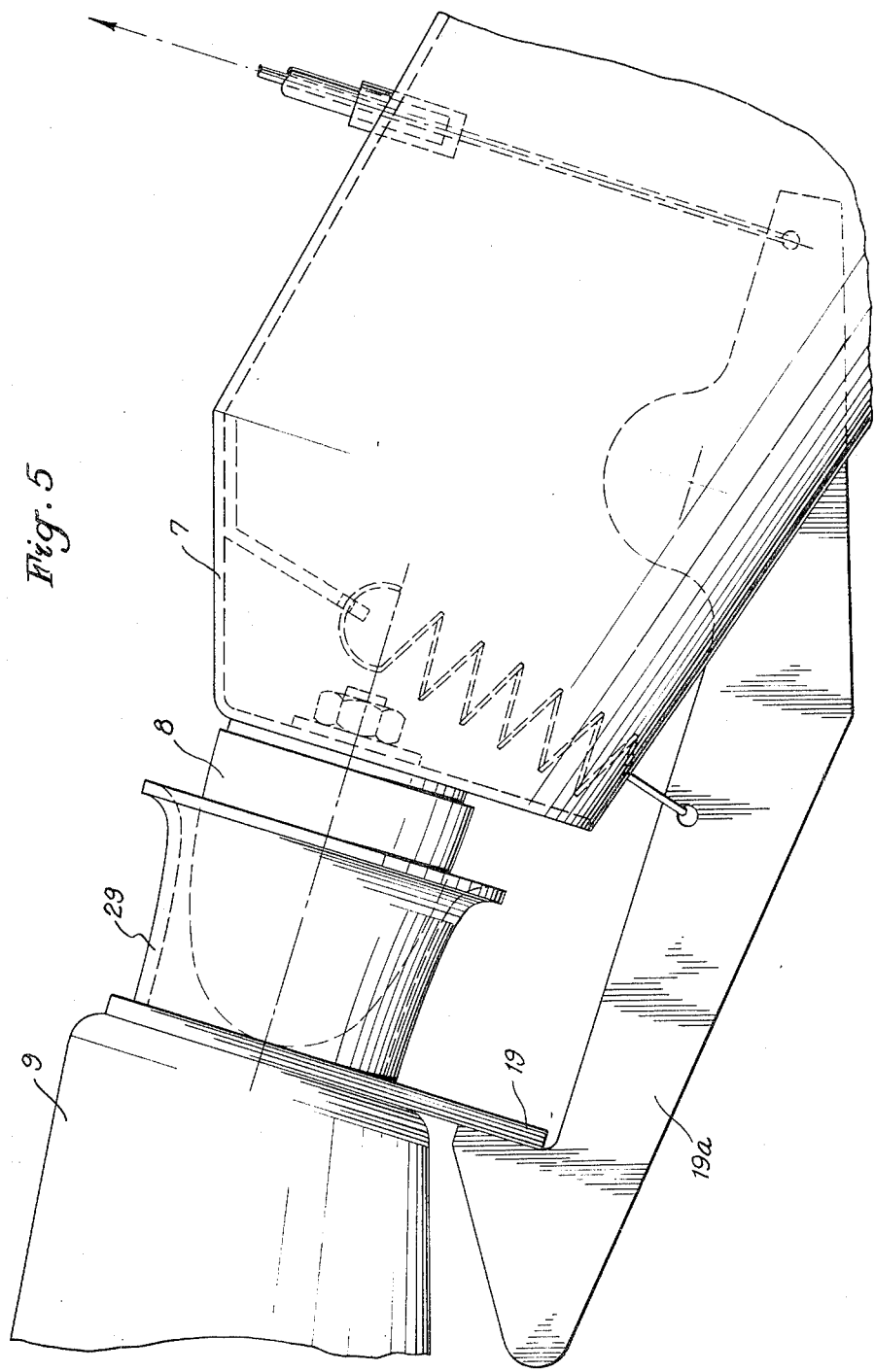
FIG. 5 is an enlarged detail view of a mechanical clamping device between the cab frame members and the pipes of the engine hood.

The engine hood 1 and the front fenders 2 are combined into a single engine hood-front fender unit 3 which is hung by hinges 4 on the adjacent side of the driver's cab 5 below the windshield. The cab frame members 6 supporting driver's cab 5 are fastened at the points 24, 25 to the vehicle framework 26. The longitudinally extending frame members 6 of the cab 5 are extended forwardly beyond the front of the cab and have on their free ends 7 bullet-shaped rubber and metal elements 8 and which project partially into the abutment 9 secured to the sidewall of the hood. Latch means 19, 19a are holding the abutment engaged with the element 8. The reinforcing metal sheets 10 which extend along the sidewalls of the hood 1 have an upper triangular portion 11 and together with the triangular rear end sheet 12, the front fenders 2 and the sidewalls of the hood form a tetrahedron-shaped reinforcing cell. (FIG. 4) Below the edge 13 at the bottom of the triangular portion, the reinforcing sheet 10 is constructed as a box beam 17, FIGS. 2 and 3, to which the pipe 9 is fastened. On the rearward end of the pipe toward the hood the pipe 9 has a conically shaped opening 29 into which the rubber and metal element 8 projects. For ventilating the cab, a slot 14 extends through the sidewall of the hood 1 through which fresh air from the outside can enter the tetrahedron cell. A hole 15 in end sheet 12 communicates with a hose 16 for the passage of preheated air into the driver's cab 5.

Having now described the means by which the objects of this invention are obtained,

I claim:

1. In a truck vehicle comprising a longitudinally extending vehicle framework, a driver's cab having a windshield, a driver's cab frame comprising two longitudinal cab frame members mounted on said framework and longitudinally extending forwardly of said cab, an engine hood and front fenders combined in a single unit hinged to said cab beneath said windshield, cooperating engaging means on the lower portion of said single unit and the front ends of said cab frame members, said engaging means including elastic means providing elastic engagement between said single unit and the front ends of said two longitudinal cab frame members.

2. In a vehicle as in claim 1, said elastic means comprising a bullet-shaped absorption element secured to the front end of each of said two longitudinal cab frame members and engaging said single unit.

3. In a vehicle as in claim 2, said cab frame members terminating rearwardly of the center of gravity of said single unit in the longitudinal direction of the vehicle.

4. In a vehicle as in claim 1, further comprising an abutment member secured to said single unit and having a cone-shaped opening therein, and said bullet-shaped absorption element being a metal-rubber element engaged in said opening.

5. In a vehicle as in claim 4, further comprising sidewalls on the engine hood, a longitudinally extending vertical reinforcing metal sheet 10 secured to the inside surface of each sidewall and joined to said abutment member 9.

6. In a vehicle as in claim 5, said metal plate being shaped as a trapezium with a triangular upper portion which forms a tetrahedron with the sidewall of the hood, a portion of the fender, and a triangular rearward end sheet 12.

7. In a vehicle as in claim 6, a slot through each sidewall and communicating with the interior of the tetrahedron, and a hole 15 in said end sheet 12, said slot and hole forming a passageway to supply air into said cab.

8. In a vehicle as in claim 2, further comprising latch means attached to one of said longitudinally cab frame members for holding said bullet-shaped absorption element in engagement with single unit.

* * * * *